US 12,122,518 B2

(12) United States Patent
Lee et al.

(10) Patent No.: US 12,122,518 B2
(45) Date of Patent: Oct. 22, 2024

(54) SEATING ARRANGEMENT

(71) Applicant: Adient Aerospace, LLC, Bothell, WA (US)

(72) Inventors: Sahng Seok Lee, Bothell, WA (US); Zhao Jin, Bothell, WA (US)

(73) Assignee: Adient Aerospace, LLC, Bothell, WA (US)

( * ) Notice: Subject to any disclaimer, the term of this patent is extended or adjusted under 35 U.S.C. 154(b) by 0 days.

(21) Appl. No.: 18/325,652

(22) Filed: May 30, 2023

(65) Prior Publication Data

US 2023/0294831 A1    Sep. 21, 2023

Related U.S. Application Data

(63) Continuation of application No. 17/127,945, filed on Dec. 18, 2020, now Pat. No. 11,685,529.

(60) Provisional application No. 62/949,806, filed on Dec. 18, 2019.

(51) Int. Cl.
    *B64D 11/06*    (2006.01)
(52) U.S. Cl.
    CPC ...... *B64D 11/0601* (2014.12); *B64D 11/0606* (2014.12)
(58) Field of Classification Search
    CPC .................. B64D 11/0606; B64D 11/0601
    See application file for complete search history.

(56) References Cited

U.S. PATENT DOCUMENTS

| 8,746,617 | B2* | 6/2014 | Beal | B64D 11/0601 244/118.6 |
| 2007/0246981 | A1* | 10/2007 | Plant | B64D 11/0641 297/248 |
| 2017/0240283 | A1 | 8/2017 | Dowty | |
| 2017/0259921 | A1 | 9/2017 | Valdes De La Garza | |
| 2020/0156794 | A1* | 5/2020 | Dowty | B64D 11/0601 |

FOREIGN PATENT DOCUMENTS

| DE | 102015105539 A1 | 10/2016 |
| EP | 1211176 A1 | 6/2002 |
| WO | 2014049362 A1 | 4/2014 |
| WO | 2019179635 A1 | 9/2019 |
| WO | WO-2021032723 A1 * | 2/2021 ......... B64D 11/0601 |

OTHER PUBLICATIONS

EP 20215684.0—Extended European Search Report, mailed Apr. 30, 2021, 7 pages.

* cited by examiner

*Primary Examiner* — Brady W Frazier
*Assistant Examiner* — Shanna Danielle Glover
(74) *Attorney, Agent, or Firm* — Yee & Associates, P.C.

(57) ABSTRACT

Seating arrangements for a vehicle cabin of a passenger transport system, in particular, of an aircraft are disclosed. The seating arrangement includes a first seat as an aisle seat having a first foot support structure, a second seat as a non-aisle seat bordering a cabin wall, the second seat having a first foot support structure, and a third seat as a non-aisle seat bordering the cabin wall. The second foot support structure is arranged between the first foot support structure and the third seat.

15 Claims, 11 Drawing Sheets

SEATING ARRANGEMENT

CROSS REFERENCE TO RELATED APPLICATIONS

This application is a Continuation of U.S. application Ser. No. 17/127,945 filed on Dec. 18, 2020, which claims priority to U.S. Provisional Patent Application No. 62/949,806 filed Dec. 18, 2019, the entire disclosures of which are hereby incorporated by reference herein.

FIELD

The present disclosure relates generally to a seating arrangement for a vehicle cabin.

BACKGROUND

There are a wide variety of seating arrangements for a vehicle cabin, for example for an aircraft cabin.

However, seating arrangements need to provide direct aisle access to improve privacy and comfort to passengers.

For example, a seating arrangement for a cabin of a passenger aircraft may comprise first, second and third suites which are positioned in the cabin in respective lateral adjacent outboard, middle and inboard positions.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

Examples herein provide improved seating arrangements for a vehicle cabin of a passenger transport system, for example of an aircraft. Examples herein provide improved seating arrangements providing a high density of seats and increased passenger (PAX) numbers while ensuring privacy, comfort and a direct aisle access to each passenger. For example, the seating arrangements provided herein are applicable to narrow body aircrafts and wide body aircrafts and business class solutions.

In an implementation provided herein is a seating arrangement for a vehicle cabin, in particular an aircraft cabin, comprising at least a number of groups arranged along a longitudinal extension direction of the vehicle cabin, wherein each group having a number of seats. Each seat having a privacy area and being delimited by a number of furniture parts from each other. The forward facing first seat and its respective privacy area are arranged extending along a longitudinal axis parallel to a longitudinal extension direction of the vehicle cabin. The at least one group or a further group has at least angled second and third seats which are arranged laterally offset with respect to the forward facing first seat and its respective privacy area, and wherein each seat has direct aisle access.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein.

Corresponding parts are marked with the same reference symbols in all figures.

DETAILED DESCRIPTION

In the following detailed description of the embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The term "about," when used with respect to a physical property that may be measured, refers to an engineering tolerance anticipated or determined by an engineer or manufacturing technician of ordinary skill in the art. The exact quantified degree of an engineering tolerance depends on the product being produced and the technical property being measured. For a non-limiting example, two angles may be "about congruent" if the values of the two angles are within ten percent of each other. However, if an engineer determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about." Similarly, the term, "plurality," as used herein may also be referred to as a list, collection, or ensemble.

Figure 1:
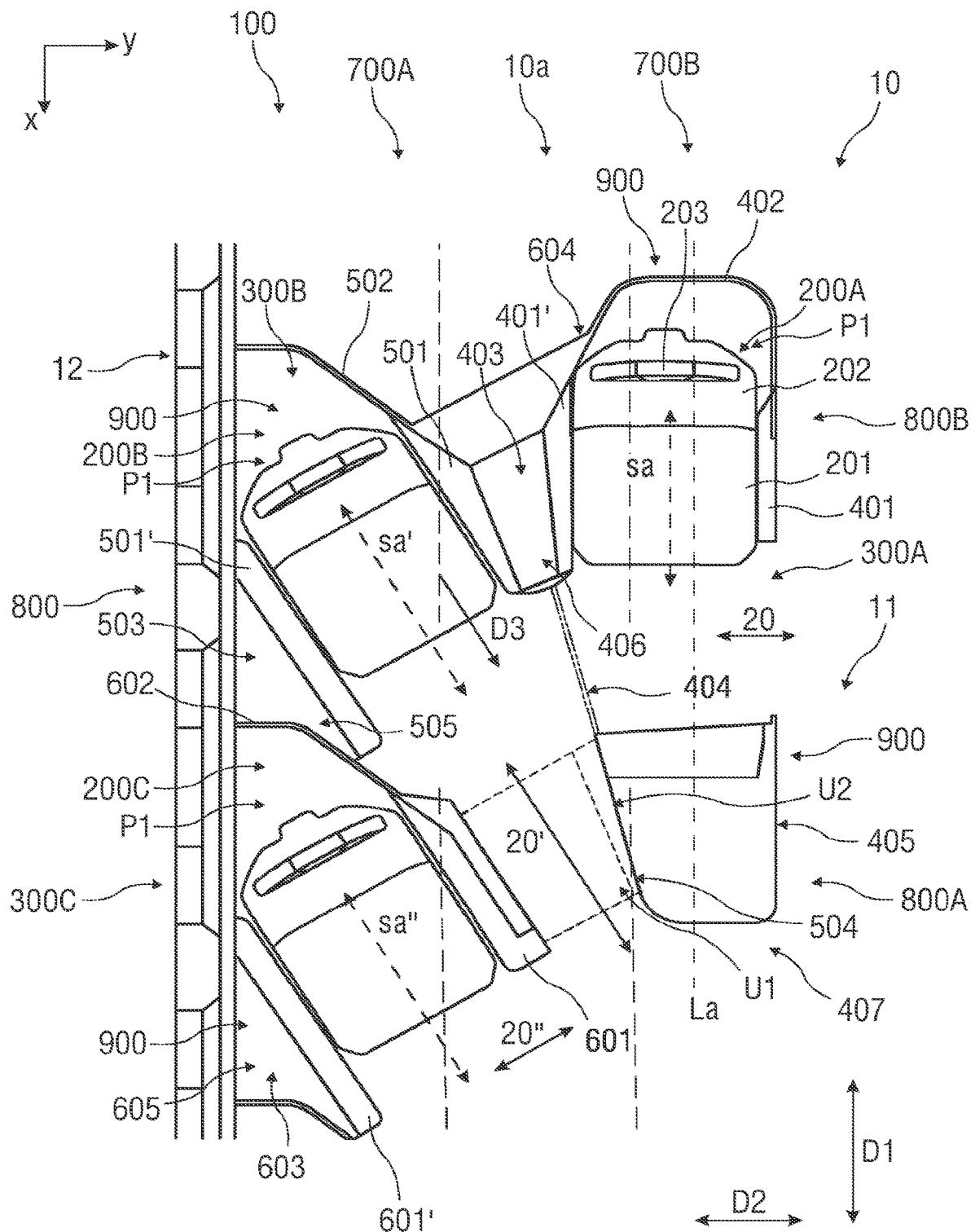
FIG. 1 shows schematically in a top view an embodiment of a seating arrangement for a vehicle cabin, in particular an aircraft cabin, comprising at least three seats.
Figure 7:
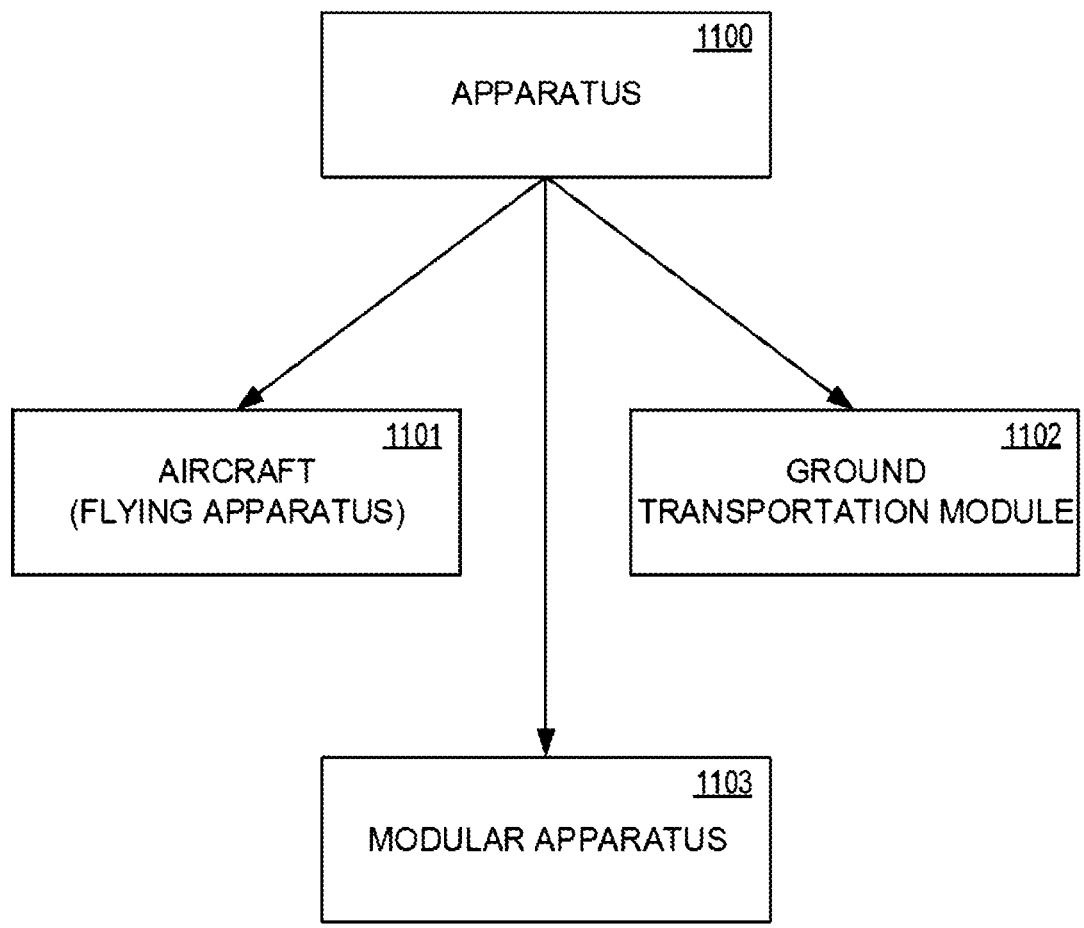
FIG. 7 shows a block diagram of an apparatus for which various aspects of the disclosure can be employed in accordance with an example.

FIG. 1 shows schematically in a top view an embodiment of a seating arrangement 100 for a vehicle cabin 10 of an apparatus 1100 as shown in FIG. 7. In the illustrated examples, the vehicle cabin 10 is an aircraft cabin, comprising at least three seats 200A to 200C. For example, the three seats 200A to 200C are arranged in one group 10a. The group 10a can be understood and seen as a column 700 or row 800, extending in a longitudinal extension direction D1, for example parallel to a longitudinal axis La, of the vehicle cabin 10. The group 10a can be understood and seen as forming one column 700 or more columns 700A, 700B or forming one row 800 or more rows 800A, 800B extending in a transverse extension direction D2 of the vehicle cabin 10. The seats 200A to 200C may be facing in flight direction.

Figure 3A:
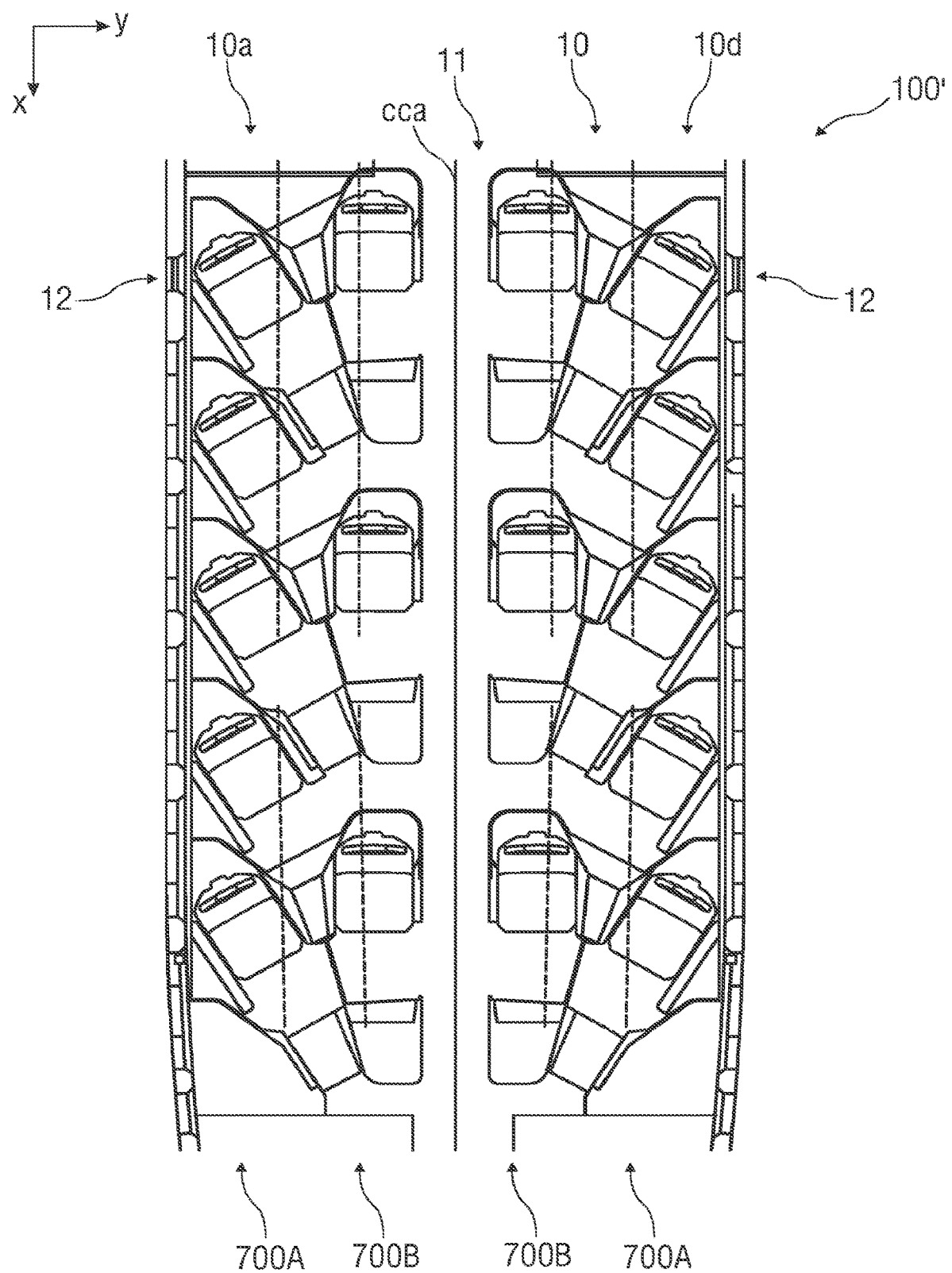
FIGS. 3A to 3C show schematically in top views embodiments of a seating arrangement for a vehicle cabin.
Figure 3B:
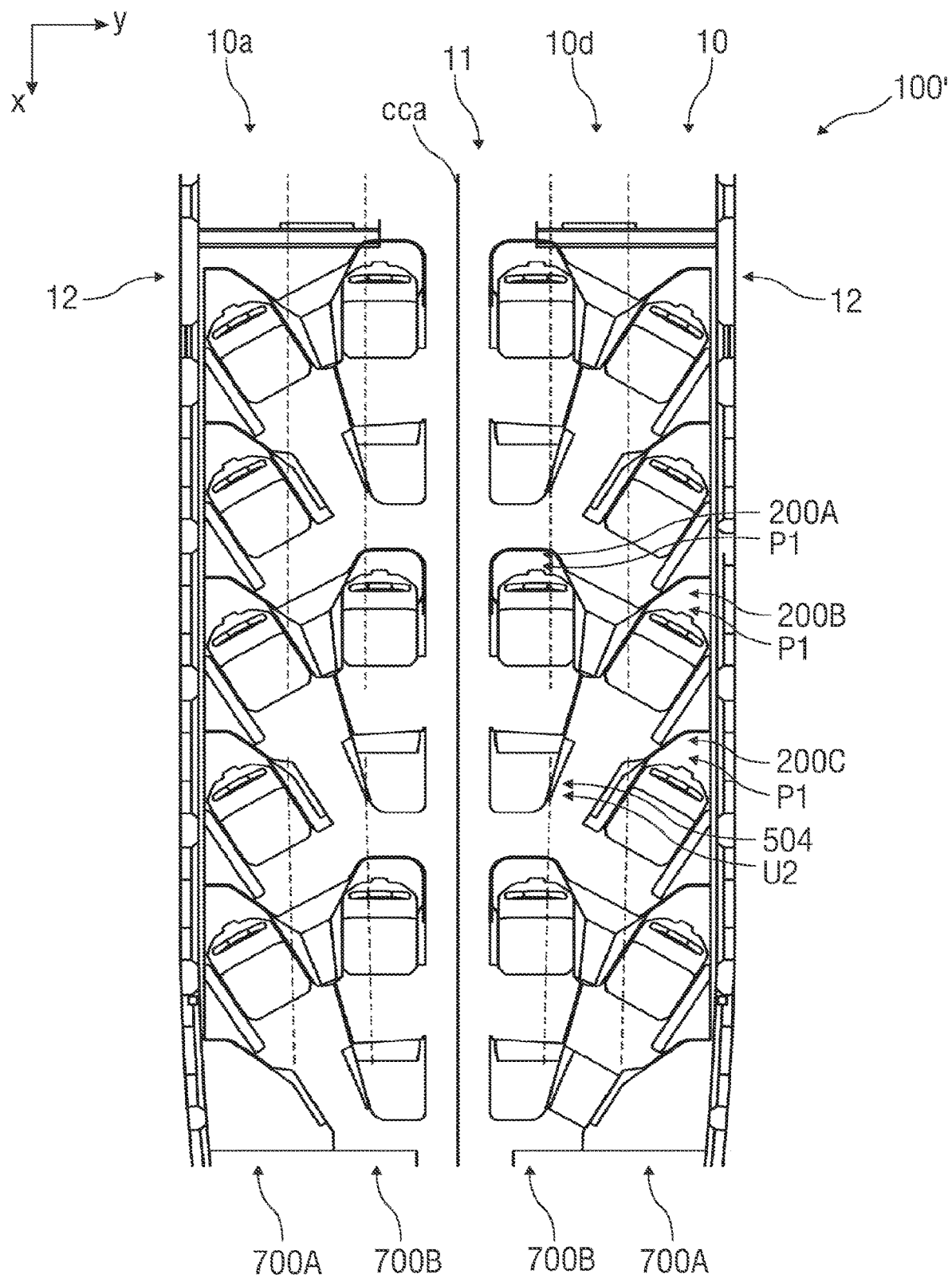
Figure 3C:
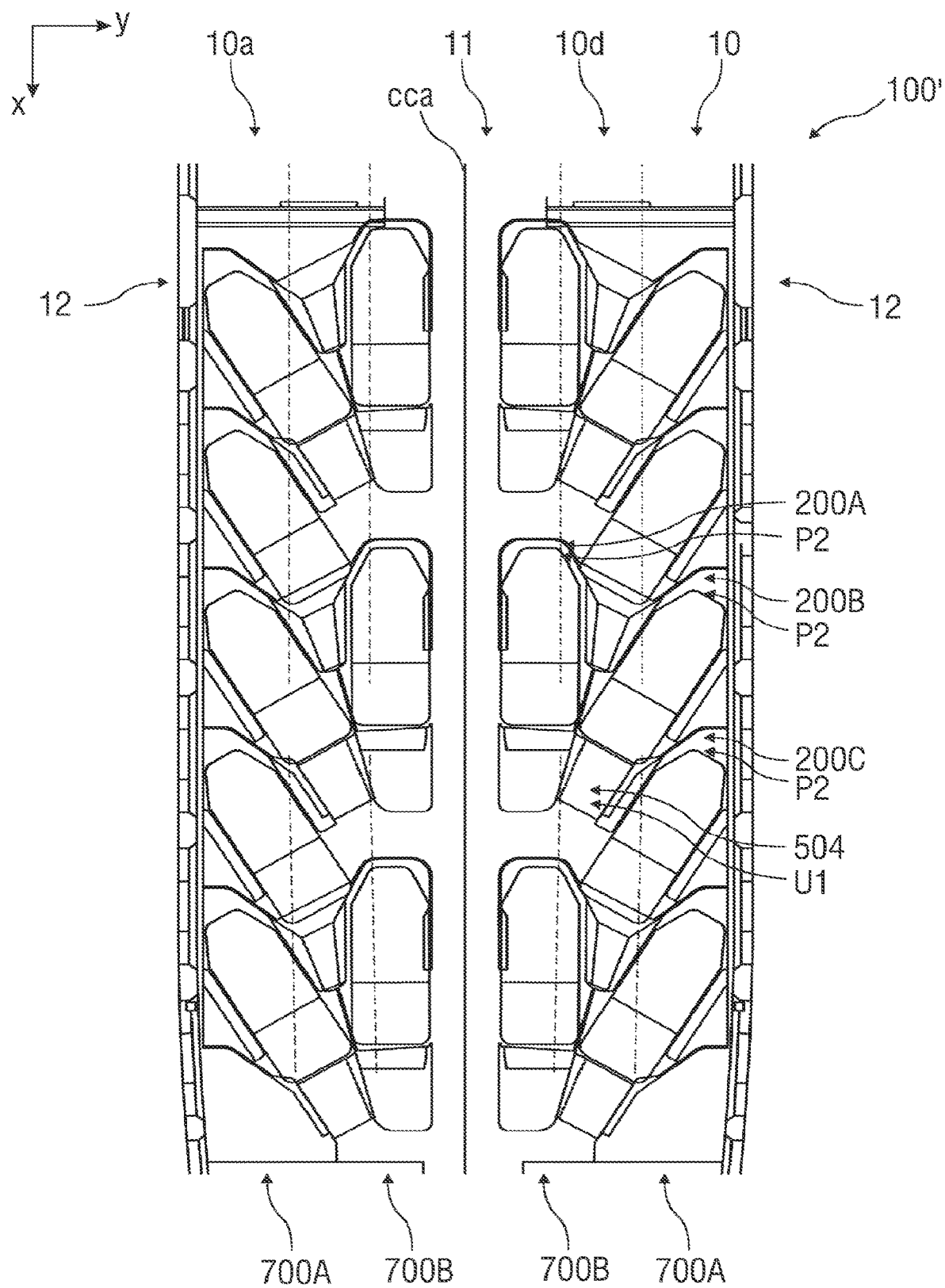

Each seat 200A to 200C is configured as being adjustable between at least a seating position P1, as shown in FIG. 3B, and at least a bed position P2, as shown is FIG. 3C. For example, each seat 200A to 200C is formed by at least a seat pan 201 and a backrest 202. Additionally, the seat 200A to 200C may comprise optionally a not further shown leg rest and/or head rest 203. For instance, each seat 2 can be brought into one or more positions, e.g. into the seating position P1 for a taxi, take-off, landing, at least an inclined comfort position and the bed position P2. Particularly, in the bed position P2 of the seat 2 the seat pan 201, the backrest 202 and optionally the leg rest and head rest 203 are brought into a substantially lie-flat, horizontal position.

The seating arrangement 100 comprises least a number of groups 10a arranged along a longitudinal extension direction D1 of the vehicle cabin 10, wherein each group 10a comprises a number of seats 200A to 200C. Each seat 200A to 200C comprises a privacy area 300A to 300C and being delimited by a number of furniture parts 900 from each other, wherein a first seat 200A is a forward facing seat 200A having a respective privacy area 300A. The forward facing first seat 200A and its respective privacy area 300A are arranged extending along a longitudinal axis La parallel to a longitudinal extension direction D1 of the vehicle cabin 10. A second seat 200B and a third seat 200C are angled seats 200B, 200C which are arranged laterally offset with respect to the forward facing first seat 200A and its respective privacy area 300A, wherein the angled seats 200B, 200C are both oriented facing in a direction towards the shown longitudinal axis La. For example, the angled second and third seats 200B, 200C are positioned angled with respect to the longitudinal axis La and facing in an inward direction D3 of the cabin 10. Each seat 200A to 200C has direct aisle access 20 to 20".

The forward facing first seat 200A is a so called in-line facing seat having a respective seat axis sa parallel to the longitudinal extension direction D1 of the vehicle cabin 10. Moreover it is possible, that the forward facing first seat 200A is positioned by a predefined angle of about less than 15° or −15°, for example less than 10° or −10°, for example between 0° to 10° or −10°, with respect to the longitudinal axis La running parallel to the longitudinal extension direction D1 of the vehicle cabin 10.

The angled second and third seats 200B, 200C are identical, that means the angled second and third seats 200B, 200C have the same angle with respect to the longitudinal axis La. For example, the angle may be about 20 to 40°, for example about 30°. For example, the angled second and third seats 200B, 200C are oriented facing inwardly or optionally outwardly depending on an orientation with respect to an aisle 11 provided within the vehicle cabin 10.

Optionally, angles of the angled second and third seats 200B, 200C may differ from each other. The angled second seat 200B has a respective seat axis sa' which is located angled with respect to the longitudinal axis La. The angled third seat 200C has a respective seat axis sa" which is located angled with respect to the longitudinal axis La.

The second and third seats 200B, 200C are arranged one behind another and facing in the inward direction D3, for example into the cabin 10.

The seats 200A to 200C are movable along their respective seat axes sa to sa" between the seating position P1 and the bed position P2. It is to be understood that each respective seat axis sa to sa" corresponds to a longitudinal extension and moving direction of each respective seat 200A to 200C when moving between the seating position P1 and the bed position P2.

Each forward facing first seat 200A is an aisle seat 200A. For further description, reference 200A will be used for both terms of the seat 200A (forward facing seat and aisle seat). Each angled second and third seat 200B, 200C is a non-aisle seat 200B, 200C. For further description reference 200B will be used for both terms (angled seat and non-aisle seat), wherein the reference 200B refers to a first non-aisle seat 200B and reference 200C refers to a second non-aisle seat 200C, wherein the first non-aisle seat 200B is arranged closer to the aisle seat 200A than the second non-aisle seat 200C. Further, the second non-aisle seat 200C is arranged in front of the first non-aisle seat 200B with respect to the longitudinal extension direction D1 of the vehicle cabin 10, for example to the direction of flight. For example, the first and second non-aisle seats 200B, 200C are arranged alternating along the longitudinal extension direction D1 of the vehicle cabin 10. Difference of the first and second non-aisle seats 200B, 200C is their respective position to the aisle seat 200A.

In the shown embodiment, group 10a refers to an outer group 10a bordering a cabin wall 12 of the vehicle cabin 10. Thereby, each non-aisle seat 200B, 200C is bordering the cabin wall 12. Each non-aisle seat 200B, 200C is for example a window seat. Each aisle seat 200A is arranged bordering the aisle 11.

A respective privacy area 300A of the aisle seat 200A comprises at least two lateral armrests 401, 401' each provided on one lateral side of the aisle seat 200A, a partition wall 402 arranged at least partially surrounding the aisle seat 200A, a side utility element 403 such as a console 406, a divider screen 404 laterally delimiting the respective privacy area 300A of the aisle seat 200A from a respective privacy area 300B of the non-aisle seat 200B, and a foot support structure 405. The foot support structure 405 may be part of a separate compartment element 407 having a not further shown inner foot well space. When the aisle seat 200A is positioned in bed position P2, a height of the seat pan 201 or optionally the leg-rest corresponds to a height of the foot support structure 405 creating a horizontal flat bed for an aisle seat passenger.

The first seat 200A, that means the aisle seat 200A, and the second seat 200B, that means the first non-aisle seat 200B, are laterally distanced from each other by the side utility element 403, as exemplarily shown in FIG. 1. The side utility element 403 is arranged between the first and second seats 200A and 200B.

Each respective privacy area 300B, 300C of the non-aisle seats 200B, 200C comprises at least two lateral armrests 501 to 601', a partition wall 502, 602 arranged at least partially surrounding the corresponding non-aisle seat 200B, 200C, and a side utility element 503, 603 such as a console 505, 605 different from the console 406 of the aisle seat 200A.

The side utility elements 403 to 603 are consoles 406, 505, 605 for passenger use. For example, each side utility element 403 to 603 is arranged lateral adjacent to the corresponding seat 200A to 200C. Each side utility element 403 to 603 may comprise not further shown devices, such as a shelf, a table, storage space and storage means. The storage means may provide storage space for a remote control, magazines, suitcases, shoes, headphones or other items belonging to the passenger or airline. Additionally, the side utility element 403 to 603 may comprise not further shown service and operational elements, such as switches and HMI-panel to control operable features of the seat 200A to 200C or features provided within a respective privacy area 300A to 300C.

The side utility element 403 of the aisle seat 200A is arranged laterally between the aisle seat 200A and the adjacent non-aisle seat 200B arranged laterally offset to the aisle seat 200A. In particular, this side utility element 403, 503 provides a substantially triangular shape, particularly a triangular-prism shape.

The foot support structure 405 associated to the aisle seat 200A provides a substantially triangular, triangular-prism or rectangular, rectangular-prism or square, cube shaped.

The first seat 200A, that means the aisle seat 200A, comprises a first foot support structure 405. The second seat 200B, that means the first non-aisle seat 200B, comprises a second foot support structure 504. The second foot support structure 504 is arranged between the first foot support structure 405 and the third seat 200C, that means the second non-aisle seat 200C. The third seat 200C, that means the second non-aisle seat 200C, comprises a foot support structure 604 which is arranged within and provided by the side utility element 403 of another group.

The first seat 200A has an aisle access 20 which is directly accessible from the aisle 11 of the cabin 10.

The second seat 200B has an aisle access 20' which is provided between the third seat 200C and a foot support structure 405 of the first seat 200A. The aisle access 20' to the second seat 200B is provided in front of the second seat 200B with respect to its respective seat axis sa'. For example, the aisle access 20' is substantially running laterally along the first seat 200A and its respective privacy area 300A.

The third seat 200C has an aisle access 20" which is provided in front of the first and second seats 200A and 200B. The aisle access 20" to the third seat 200C extends substantially perpendicular to its respective seat axis sa".

The foot support structure 504 for a passenger of the first non-aisle seat 200B is arranged laterally between the foot support structure 405 of the aisle seat 200A and a lateral armrest 601 of the second non-aisle seat 200C. For example, the foot support structure 405 of the aisle seat 200A is arranged along the longitudinal axis La parallel the longitudinal extension direction D1 of the vehicle cabin 10. When the first non-aisle seat 200B is positioned in bed position P2, a height of the seat pan 201 or optionally the leg-rest corresponds to a height of the foot support structure 504 creating a horizontal flat bed for a first non-aisle seat passenger. The foot support structure 504 of the first non-aisle seat 200B is movable between a deployed use position U1, as shown in FIG. 3B, and a stowed non-use position U2, as shown in FIG. 3C, wherein in the stowed non-use position U2 the direct aisle access 20' of the first non-aisle seat 200B is at least enlarged, in particular opened. For example, the movable foot support structure 504 is movably mounted, such as hinged, to the foot support structure 405 of the aisle seat 200A and/or the armrest 601 of the second non-aisle seat 200C. In particular, when the movable foot support structure 504 is positioned in the deployed use position U1 the direct aisle access 20' of the first non-aisle seat 200B may be partially or fully closed. By storing the movable foot support structure 504 in the stowed non-use position U2, the direct aisle access 20' is fully freed for use. An easy egress and ingress feature is provided to the first non-aisle seat passenger whilst providing a dense arrangement of seats 200A to 200C and same comfort and privacy features to all passengers of the seating arrangement 100.

For instance, the shown three seats 200A to 200C of FIG. 1 may be arranged in repeating manner along the longitudinal extension direction D1 and/or the transverse extension direction D2 of the vehicle cabin 10. For example, such repeating arrangements of the seats 200A to 200C and their respective privacy areas 300A to 300C are shown in FIGS. 2A to 2B and 3A to 3C.

For example, the first non-aisle seat 200B is delimited from the aisle seat 200A at least by the side utility element 403, wherein the side utility element 403 comprises at least a not in detailed shown upper utility surface, such as a shelf, for an aisle seat passenger and/or a first non-aisle seat passenger, wherein the side utility element 403 may further comprise a foot support structure 604 for a rearward arranged second non-aisle seat 200C.

For example, the foot support structures 405, 504, 604 may comprise or being a movable cushioned support element for supporting feet and/or legs of a passenger in a sleeping position.

The direct aisle access 20' of the first non-aisle seat 200B is provided between the aisle seat 200A and its respective privacy area 300A and the second non-aisle seat 200C. The direct aisle access 20' of the first non-aisle seat 200B is substantially running laterally along the aisle seat 200A and its respective privacy area 300A and in front the foot support structure 405 of the aisle seat 200A. Due to the set-up of the aisle seat 200A and the non-aisle seats 200B, 200C, the direct aisle access 20' of the first non-aisle seat 200B (beginning from the first non-aisle seat 200B) firstly extends in front of the first non-aisle seat 200B, for example along the respective seat axis sa' of the first non-aisle seat 200B, then lateral along the divider screen 404 and in front of the foot support structure 405. For example, the first non-aisle seat 200B is sandwiched between the aisle seat 200A and the second non-aisle seat 200C.

The direct aisle access 20" of the second non-aisle seat 200C is substantially running in front of the foot support structure 504 of the first non-aisle seat 200B and merges with the direct aisle access 20' of the first non-aisle seat 200B. For instance, the direct aisle access 20" of the second non-aisle seat 200C is extending, in particular running, substantially perpendicular to the respective seat axis sa" of the second non-aisle seat 200C and further along a front of each foot support structure 504 and 405. In particular, the direct aisle accesses 20' and 20" are provided between a front side of the foot support structure 405 of a rearward arranged aisle seat 200A and a rear side of a front arranged aisle seat 200A, in particular on a rear side of its partition wall 402.

Moreover, an additional privacy for passengers of the angled non-aisle seats 200B and 200C is provided due to extending shapes of the direct aisle accesses 20', 20".

The direct aisle access 20 of the aisle seat 200A is arranged next to the aisle seat 200A, in particular extending substantially perpendicular to the respective seat axis sa of the aisle seat 200A. This direct aisle access 20 is provided between the aisle seat 200A and the corresponding foot support structure 405. The aisle seat 200A provides a wide direct aisle access 20. For example, the aisle seat 200A may be offered to passengers with disabilities. The aisle seat 200A and the respective privacy area 300A may be configured to comply with so called DOT requirements.

When seen in rows 800B, 800A, the seating arrangement 100 comprises a number of rows 800B, 800A arranged along a longitudinal extension direction D1 of the vehicle cabin 10, wherein one row 800B comprises two lateral substantially adjacent first and second seats 200A and 200B. The other row 800A arranged in front of the row 800B comprises one third seat 200C and two foot support structures 405, 504 for the first and second seats 200A and 200B of the rear row 800B, wherein each foot support structure 405, 504 is associated with one of the first and second seats 200A and 200B of the rear row 800B. In particular, both foot support structures 405, 504 are arranged on the same lateral side adjacent to the one third seat 200C of the front row 800A. The foot support structures 405, 504 are arranged laterally between the aisle 11 of the vehicle cabin 10 and the third seat 200C. For example, the two foot support structures 405, 504 are arranged laterally adjacent, for example directly adjoining, each other. For example, the two foot support structures 405, 504 may contact each other.

Figure 2A:
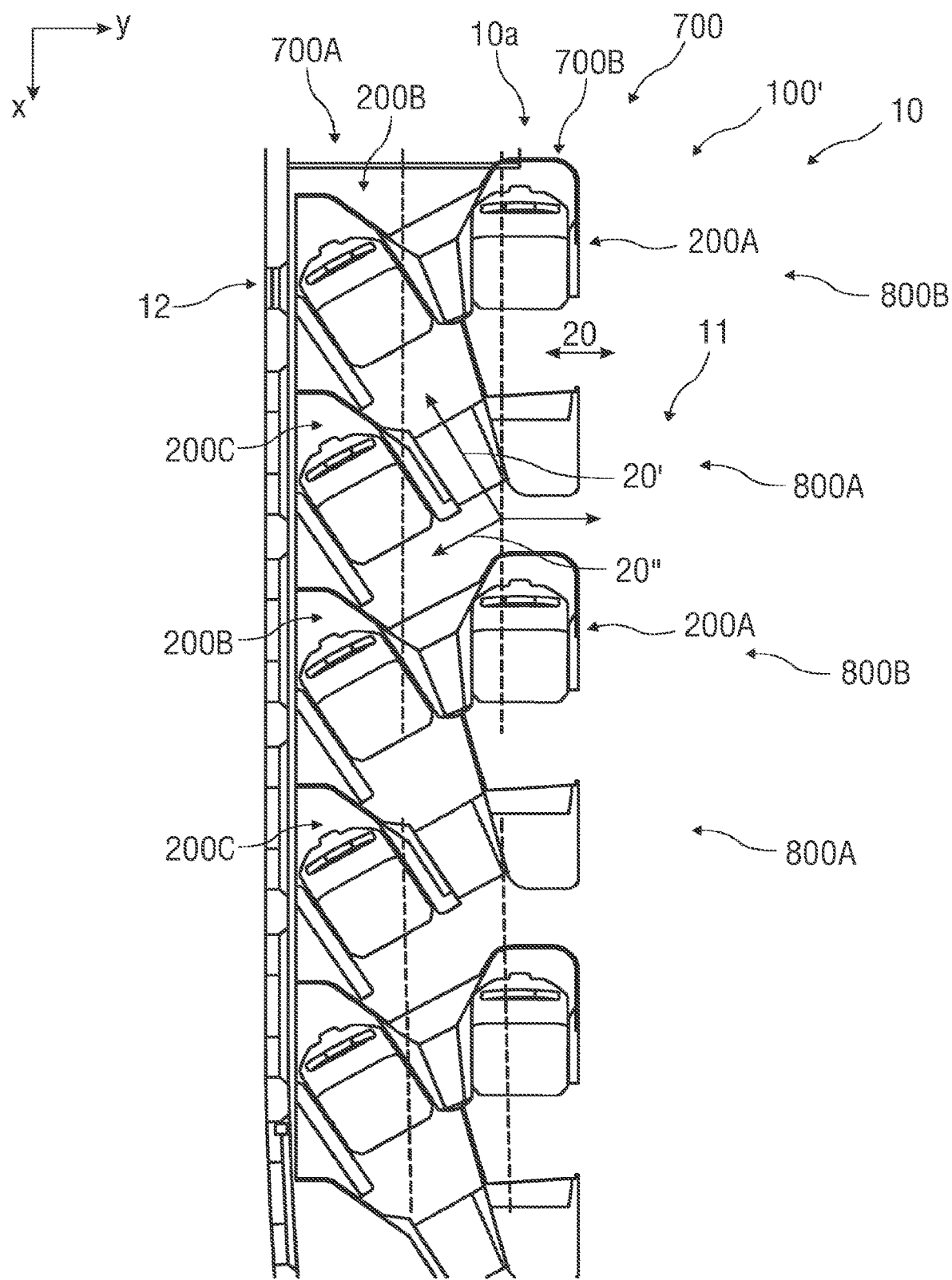
FIGS. 2A and 2B show schematically in top views embodiments of a seating arrangement for a vehicle cabin, comprising a plurality of seats.
Figure 2B:
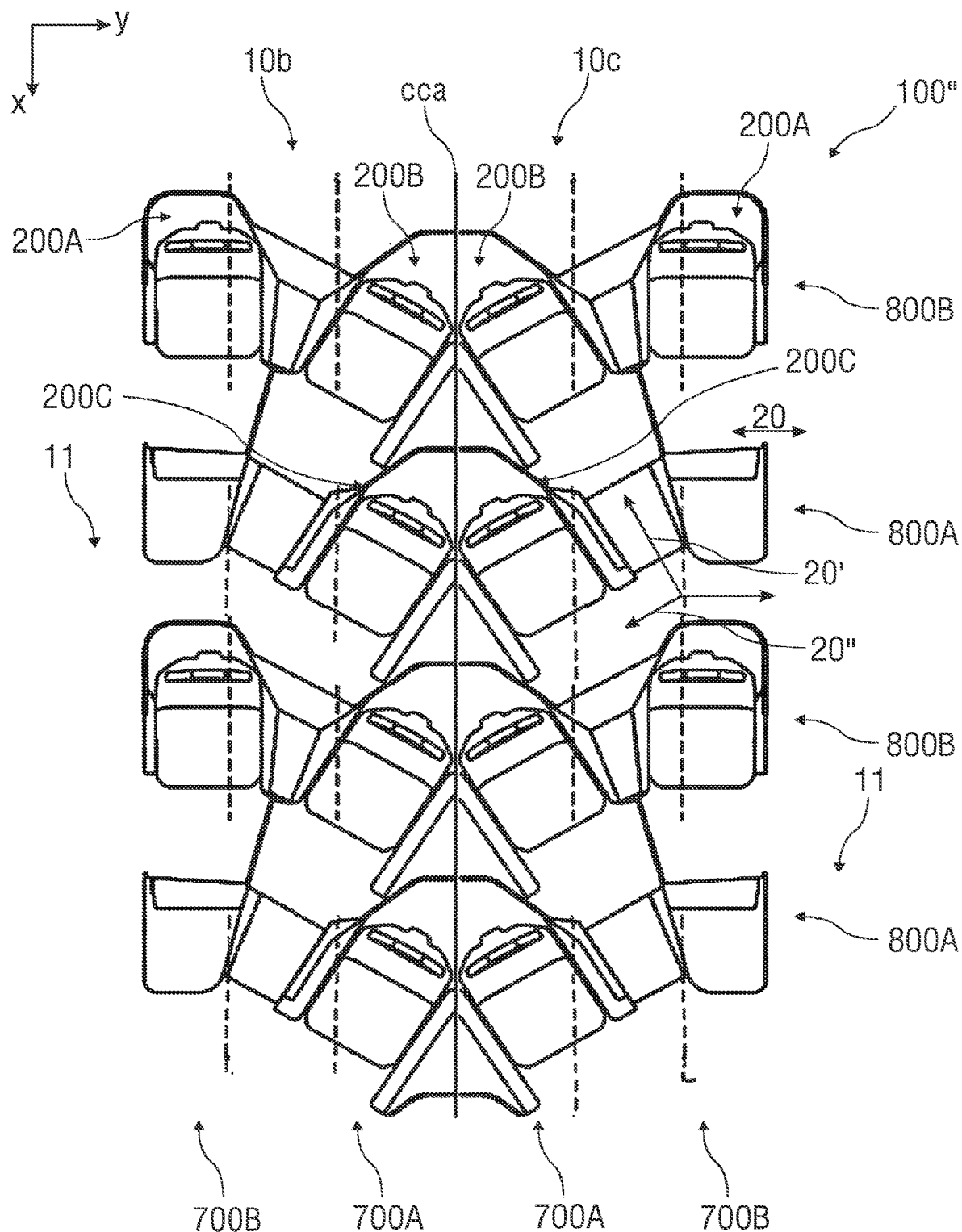

FIGS. 2A and 2B show schematically in top views embodiments of a seating arrangement 100', 100" for a vehicle cabin 10, comprising a plurality of seats 200A to 200C. For example, FIG. 2A shows a seating arrangement 100' having an outer group 10a arranged bordering a cabin wall 12, wherein the group 10a comprises a number of angled non-aisle seats 200B and 200C configured as window seats and a number of forward facing aisle seats 2, 200A. Moreover, the group 10a comprises identical sequences of alternating seats 200A to 200C. For example, FIG. 2B shows a seating arrangement 100" having a first center group 10b and a second center group 10c each comprising a number of angled non-aisle seats 200B and 200C and a number of forward facing seats 200A. The center groups 10b, 10c are arranged adjacent to each other in a transverse extension direction D2 of the vehicle cabin 10, for example of a wide body aircraft, and may be divided by a number of divider assemblies arranged along a center axis cca of the vehicle cabin 10. For example, the groups 10b, 10c comprise identical arrangements of seats 200A to 200C (mirrored along the center axis cca). The center groups 10b, 10c are each bordering an aisle 11.

In particular, a distance between two forward facing aisle seats 200A arranged along the longitudinal extension direction D1 of the vehicle cabin 10 is greater than a distance between two angled non-aisle seats 200B and 200C arranged in a staggered manner along the longitudinal extension direction D1 of the vehicle cabin 10.

Further, it may be seen that the seating arrangements 100 to 100" comprises a number of columns 700A and 700B, such as sub-columns, whereby a first column 700A comprises a number of angled non-aisle seats 200B and 200C, and a second column 700B adjoining the first column 700A comprises a number of forward facing aisle seats 200A. It is to be understood that each column 700A and 700B comprises one sort of seats 200A to 200C.

Also, the shown three seats 200A to 200C and their respective privacy areas 300A to 300C may be seen as one seating unit configured from three seats 200A to 200C. For example, two angled seats 200B, 200C are associated with one forward facing seat 200A and its respective privacy area 300A. The shown three seats 200A to 200C and their respective privacy areas 300A to 300C may be configured as one passenger module which may be staggered along the longitudinal extension direction D1 and/or transverse extension direction D2 of the vehicle cabin 10.

In an example, the forward facing seat 200A and the respective privacy area 300A have a total length with respect to the longitudinal direction D1 which correspond to a longitudinal area in which two angled seats 200B, 200C are arranged one behind another.

In an example, the two angled seats 200B, 200C are arranged relative offset to the forward facing seat 200A in such a manner that a longitudinal area in which the two angled seats 200B, 200C are arranged is covered by the forward facing seat 200A and the respective privacy area 300A.

The illustrated three seats 200A to 200C and their respective privacy areas 300A to 300C, in some examples, can be configured as one passenger module which may be staggered along the longitudinal extension direction D1 and/or transverse extension direction D2 of the vehicle cabin 10.

The divider screen 404 is arranged between the angled seat 200B and the forward facing seat 200A in some examples. The divider screen 404 is configured to separate the privacy areas 300B and 300A from one another.

FIGS. 3A to 3C show schematically in top views embodiments of a seating arrangement 100' for a vehicle cabin 10, such as a narrow body aircraft, comprising two outer groups 10a, 10d and one aisle 11 provided between the two outer groups 10a, 10d.

Figure 4:
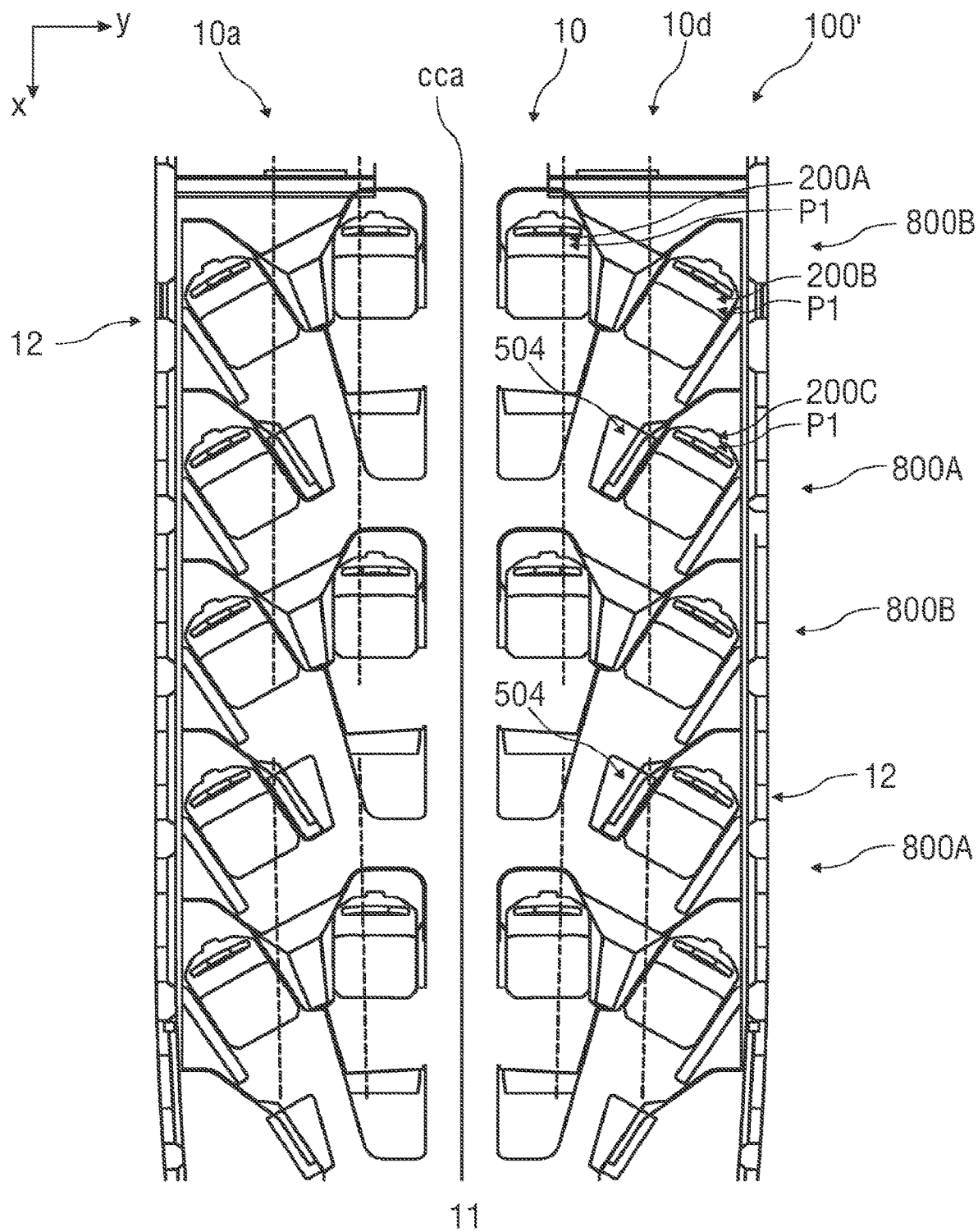
FIG. 4 shows schematically in a top view an embodiment of a seating arrangement for a vehicle cabin comprising a plurality of seats.

FIG. 4 shows schematically in a top view an embodiment of a seating arrangement 100' for a vehicle cabin 10, such as a narrow body aircraft, comprising two outer groups 10a, 10d and one aisle 11 provided between the outer groups 10a, 10d. Further shown is a foot support structure 504 for the first non-aisle seat 200B which is fixedly mounted to the lateral armrest 601 of the second non-aisle seat 200C and/or to a respective furniture part 900 of the second non-aisle seat 200C. Alternatively, the foot support structure 504 is fixedly mounted to the foot support structure 405 and/or to a respective compartment element 407 providing the foot support structure 405 for the aisle seat 200A. As exemplary shown, the foot support structure 504 is narrower than a total distance between the second non-aisle seat 200C, for example the lateral armrest 601, and the foot support structure 405 of the aisle seat 200A.

Figure 5:
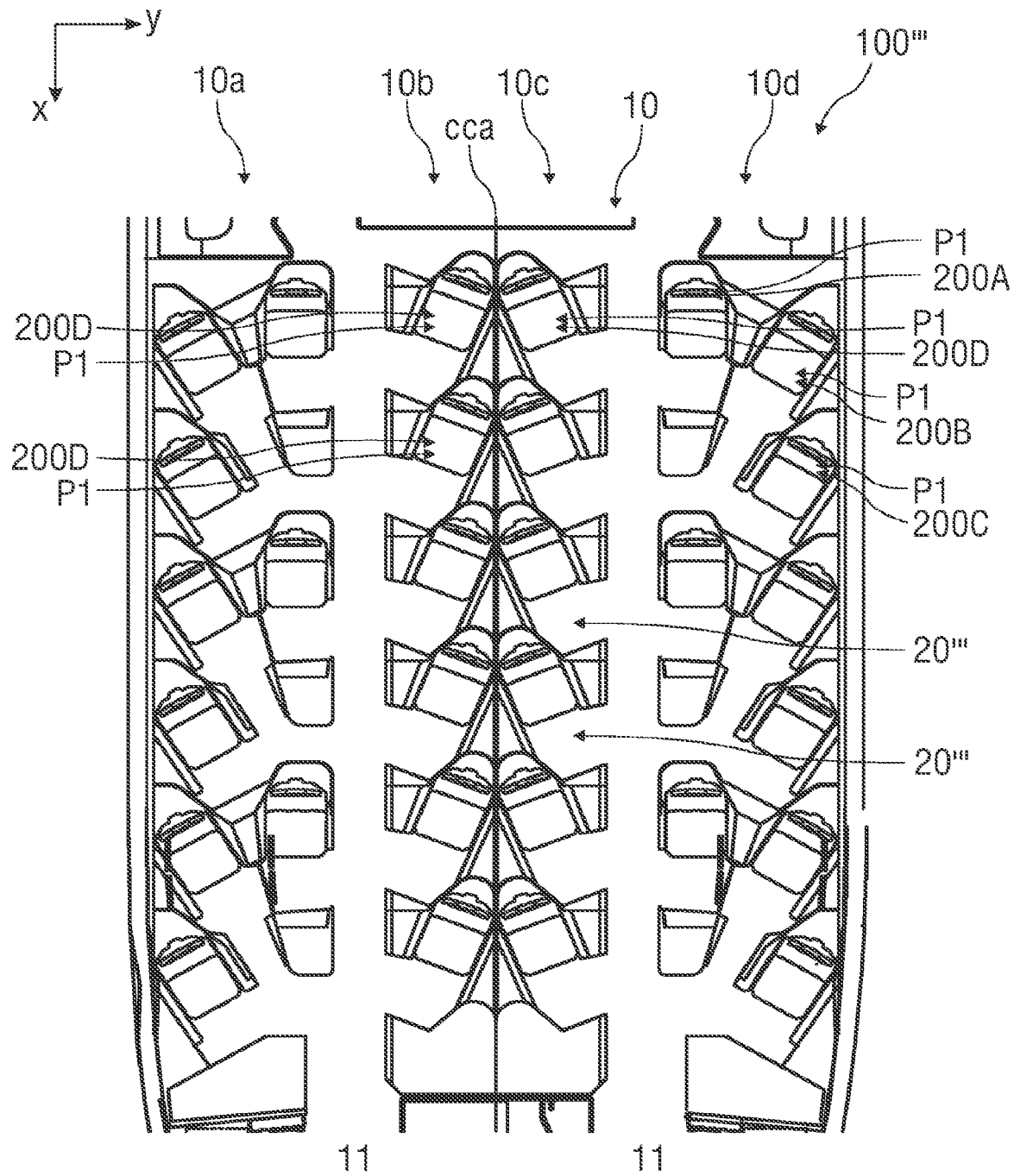
FIG. 5 shows schematically in a top view an embodiment of a seating arrangement for a vehicle cabin comprising a plurality of seats.

FIG. 5 shows schematically an embodiment of a seating arrangement 100" for a vehicle cabin 10, in particular of a wide body aircraft. For example, the shown seating arrangement 100''' comprises a first center group 10b and a second center group 10c each comprising a number of angled fourth seats 200D forming a so called herringbone seating layout. Each angled fourth seat 200D having a direct aisle access 20". The center groups 10b, 10c are arranged adjacent to each other in a transverse extension direction D2 of the vehicle cabin 10 and may be divided by a number of not further shown divider assemblies such as screens or the like arranged along the center axis cca of the vehicle cabin 10. Further, the seating arrangement 100''' comprises two outer groups 10a, 10d and two aisles 11 provided between a center group 10b, 10c and an outer group 10a, 10d. The fourth seats 200D may also be one of a forward facing or outward facing or inward facing seat 200D.

Figure 6:
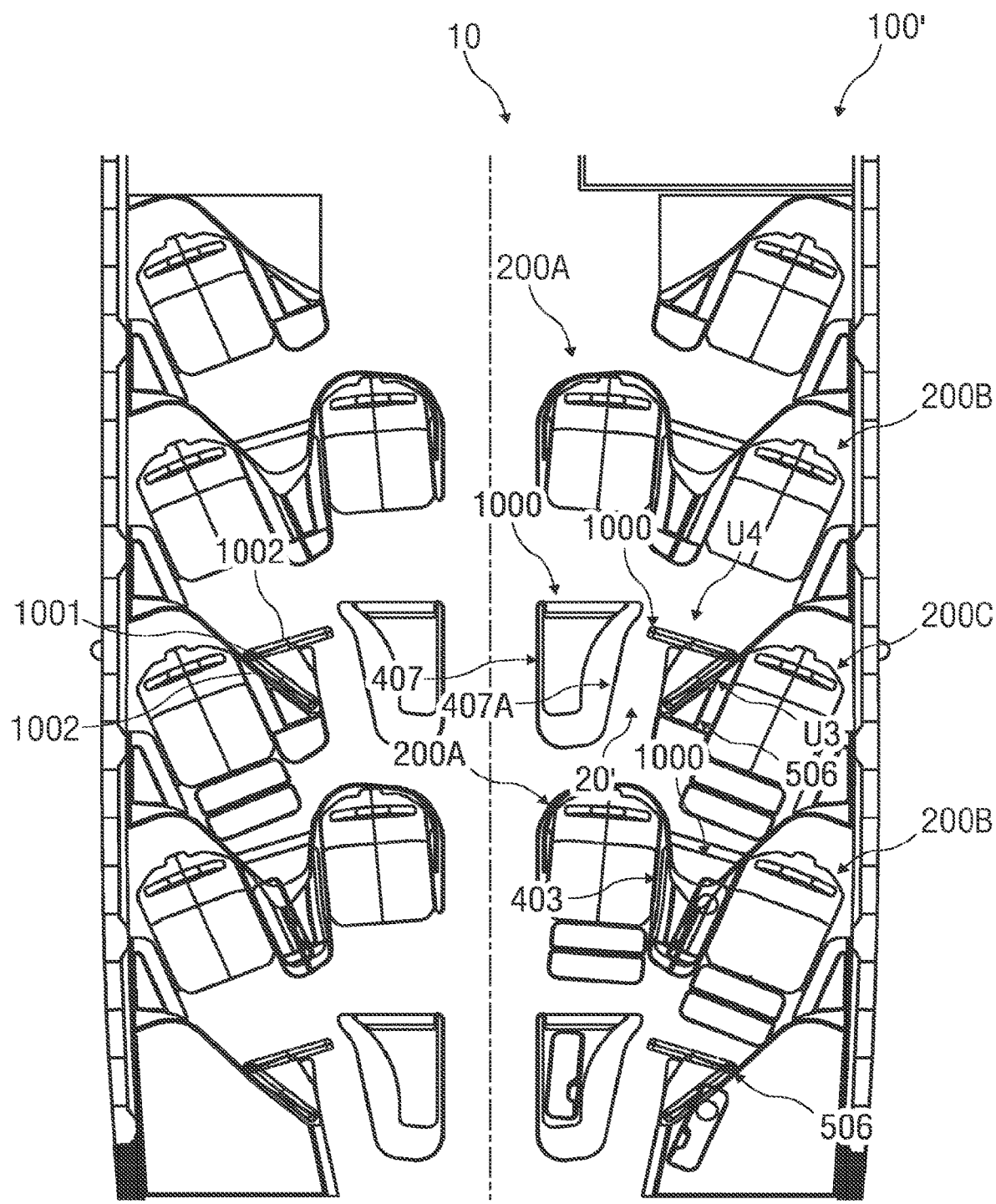
FIG. 6 shows schematically in a top view an embodiment of a seating arrangement for a vehicle cabin comprising a plurality of seats.

FIG. 6 shows schematically an embodiment of a seating arrangement 100'. As shown, the first seat 200A, being the aisle seat 200A, comprises a first foot support structure 405. The second seat 200B, being the first non-aisle seat 200B, comprises a second foot support structure 504. The second foot support structure 504 is arranged between the first foot support structure 405 and the third seat 200C (being the second non-aisle seat 200C). The third seat 200C comprises a foot support structure 604 which is arranged within and provided by the side utility element 403 of another group. The side utility element 403 in some examples comprises an entertainment device 1000, for example having a screen such as a display 1002, an infotainment service or the like for a rear passenger, for example for a third seat 200C of a rear group.

In the illustrated example, the second seat 200B comprises a separate compartment element 506 which is arranged in front of the second seat 200B. For example, the separate (and additional) compartment element 506 is arranged between the third seat 200C and the compartment element 407 of the first seat 200A. For example, the compartment element 506 is arranged between the lateral armrest 601 of the third seat 200C and foot support structure 405 of the first seat 200A. The compartment element 506 is configured being narrower in width than a lateral distance between the third seat 200C or its lateral armrest 601 and the compartment element 407 and/or the foot structure 405 of the first seat 200A. The compartment element 506 can be used as an additional console by a passenger of the third seat 200C in some examples.

In some examples, the foot support structure 504 is arranged within the compartment element 506. That is, the foot support structure 504 is enclosed by the compartment element 506. In some examples, the compartment element 407 can also comprise an entertainment device 1000 for a passenger of the corresponding first seat 200A. The entertainment device 1000 for a passenger of the second seat 200B is arranged between the compartment element 407 and the third seat 200C. For example, the entertainment device 1000 is mounted to the separate compartment element 506.

In one example, the entertainment device 1000 of the compartment element 506 has a carrier device 1001 which movably, for example pivotably, supports the entertainment device 1000 above or on the separate compartment element 506. The carrier device 1001 supports the display 1002 in movable manner. In the seating position P1, which can be referred to as a TTL-position, the passenger of the second seat 200B can pivot the display 1002 from a stowed position U3, in which the display 1002 is not protruding into the aisle access 20', to a deployed position U4, in which the display 1002 is protruding into the aisle access 20'. The display 1002 can be pivoted toward and away from the second seat 200B. In the stowed position U3, the aisle access 20' is enabled to be passed. In the deployed position U4, the aisle access 20' is substantially closed. More privacy is thereby provided to the passenger of the second seat 200B.

The second seat 200B has an aisle access 20' in the illustrated example which is provided between the third seat 200C and a foot support structure 405 of the first seat 200A. The aisle access 20' to the second seat 200B is provided in front of the second seat 200B with respect to its respective seat axis sa'. For example, the aisle access 20' is provided substantially laterally along the first seat 200A and its respective privacy area 300A. In one example, the aisle access 20' is provided between the compartment element 407 of the first seat 200A and the separate compartment element 506 associated to the second seat 200B. The aisle access 20' therefore, is configured having a lateral distance between the compartment element 407 and the separate compartment element 506.

In one example, the compartment element 407 has a substantially bent inward portion such as a bend 407A. The bend 407A is substantially formed facing away from the separate compartment element 506. As seen in the transverse extension direction of the vehicle cabin 10, the third seat 200C is arranged lateral adjacent the compartment elements 407, 506.

With reference now to FIG. 7, the apparatus 1100 is provided. As shown in FIG. 7, an example of the apparatus 1100 is a flying apparatus 1101, such as an aerospace vehicle, aircraft, air cargo, flying car, satellite, planetary probe, deep space probe, solar probe, and the like. As also shown in FIG. 7, a further example of the apparatus 1100 is a ground transportation apparatus 1102, such as an automobile, a truck, heavy equipment, construction equipment, a boat, a ship, a submarine, and the like. A further example of the apparatus 1100 shown in FIG. 7 is a modular apparatus 1103 that comprises at least one or more of the following modules: an air module, a payload module, and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

Figure 8:
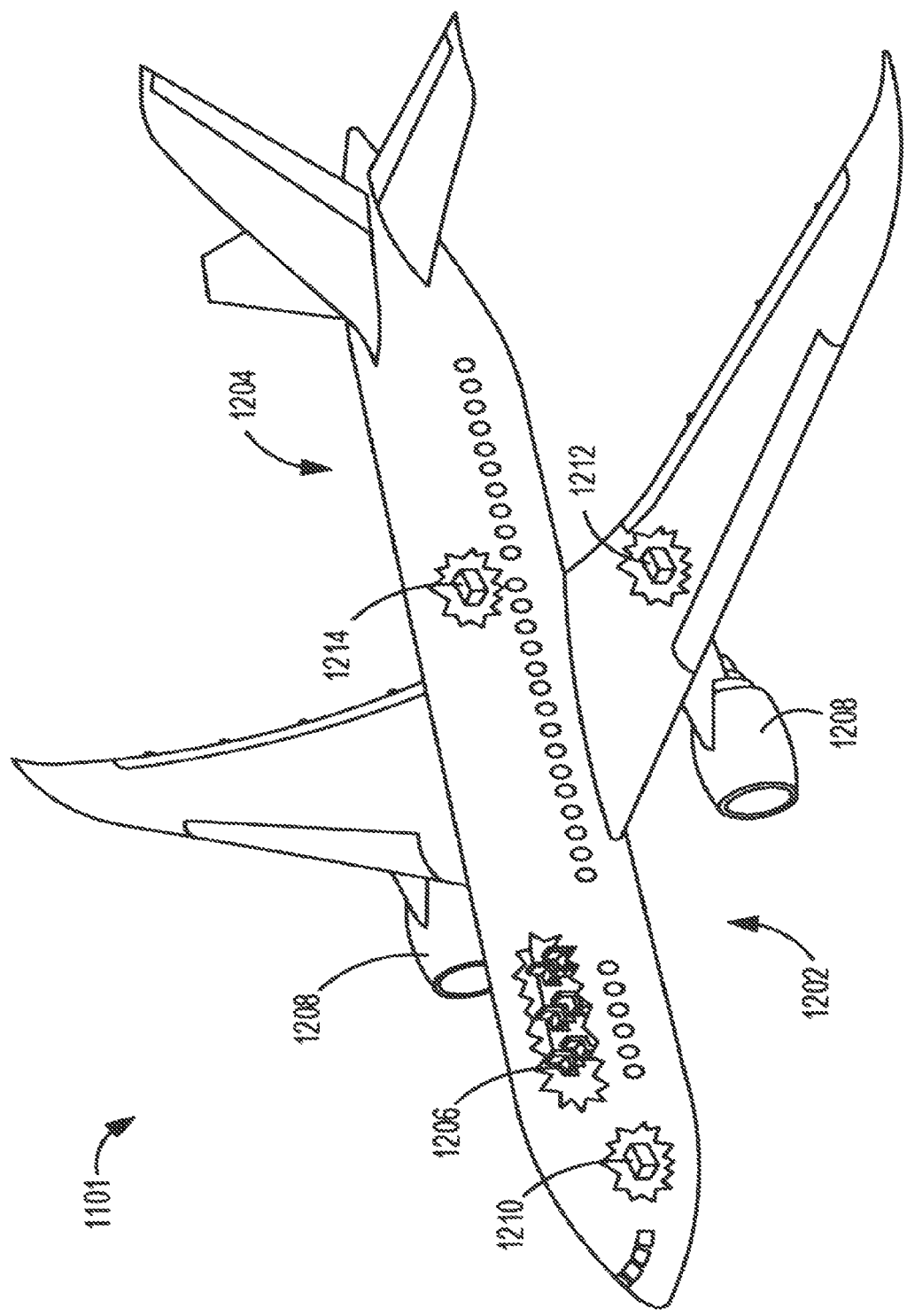
FIG. 8 shows a schematic perspective view of a particular flying apparatus in accordance with an example.

With reference now to FIG. 8, a more specific diagram of the flying apparatus 1101 is depicted in which an implementation of the disclosure is advantageously employed. In this example, the flying apparatus 1101 is an aircraft produced by an apparatus manufacturing and service method and includes an airframe 1202 with a plurality of systems 1204 and an interior 1206. Examples of the plurality of systems 1204 include one or more of a propulsion system 1208, an electrical system 1210, a hydraulic system 1212, and an environmental system 1214. However, other systems are also candidates for inclusion. Although an aerospace example is shown, different advantageous examples are applied to other industries, such as the automotive industry, etc.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

An advantage of each passenger seating arrangement of the aforementioned implementations is to optimize a use of space within the vehicle cabin whilst providing maximum comfort and privacy for the passengers. For example, in each proposed seating arrangement the seats are at least staggered in transverse direction of the vehicle cabin in such way that a substantially narrow total group width is achieved. Furthermore advantageously is that each proposed seating arrangement of the present invention allows applying a comparatively high number of non-aisle seats, in particular such as window seats, in combination with a different number of aisle seats within the vehicle cabin.

The implementations offer a specific, novel seating layout and design having combined angled and forward facing seats compared to already known seating arrangements, such as simple so called in-line seating layouts and herringbone seating layouts. The seating arrangements according to the disclosure may each increase an optical appearance of the vehicle cabin providing a feeling to the passengers of a new aircraft cabin design having individual privacy areas and aisle accesses. Each seat is provided with same features.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Clauses

Further, the disclosure comprises embodiments according to the following clauses:

Clause 1. A seating arrangement for a vehicle cabin, wherein the seating arrangement comprising:
- one group having a number of seats and extending along a longitudinal extension direction of the vehicle cabin;
- each seat having a privacy area and being delimited by a number of furniture parts from each other; wherein the group having:
- a first seat with a respective privacy area arranged extending along the longitudinal extension direction of the vehicle cabin;
- an angled second seat; and
- an angled third seat;
- the angled second seat and the angled third seat are positioned angled with respect to the longitudinal extension direction of the vehicle cabin;
- the angled second seat and the angled third seat are arranged one behind another and laterally offset with respect to the first seat and its respective privacy area; and
- wherein each seat has direct aisle access.

Clause 2. A seating arrangement for a vehicle cabin, wherein the seating arrangement comprising:
- two directly adjoining groups having a number of seats and extending along a longitudinal extension direction of the vehicle cabin;
- a first group having a number of first seats arranged along a longitudinal axis parallel to the longitudinal extension direction of the vehicle cabin; and
- a second group adjoining the first group having a number of angled second and third seats;
- the angled second and third seats are positioned angled with respect to the longitudinal extension direction of the vehicle cabin;
- wherein a longitudinal distance between two first seats of the first group is greater than a longitudinal distance between the angled second and third seats of the second group.

Clause 3. A seating arrangement for a vehicle cabin, wherein the seating arrangement comprising:
- a number of group arranged alternating along a longitudinal extension direction of the vehicle cabin;
- a first group and a second group each having a number of seats,
- the first group comprising at least two lateral substantially adjacent first and second seats, and
- the second group is arranged in front of the first group and having a third seat and two foot support structures for the seats of the first group,
- wherein both foot support structures are arranged on the same lateral side adjacent to the third seat of the second group.

Clause 4. The seating arrangement according to clause, 2 or 3, wherein the first seat is a forward facing first seat having a seat axis extending substantially parallel to the longitudinal extension direction of the vehicle cabin, and the second and third seats are angled seats each having seat axis extending substantially angled to the longitudinal extension direction of the vehicle cabin Clause 5. The seating arrangement according to clause 1, 2 or 3, wherein each forward facing seat is an aisle seat and each angled seat is a non-aisle seat, wherein a first non-aisle seat is arranged closer to the aisle seat than a second non-aisle seat.

Clause 6. The seating arrangement according to clause 1, 2 or 3, wherein the first seat is configured as an aisle seat and the second and third seats are configured as non-aisle seats.

Clause 7. The seating arrangement according to clause 1, 2 or 3, wherein the second and third seats having identical seat axes arranged angled with respect to a longitudinal axis of the vehicle cabin.

Clause 8. The seating arrangement according to clause 1, 2 or 3, wherein the first and second seats are arranged laterally adjacent to each other and the third seat is arranged in front of the second seat.

Clause 9. The seating arrangement according to clause 1, 2 or 3, wherein the second and third seats are arranged one behind another and facing in an inward direction of the vehicle cabin.

Clause 10. The seating arrangement according to clause, 2 or 3, wherein the first seat and the second seat are laterally distanced from each other by at least a side utility element arranged between the first and second seats.

Clause 11. The seating arrangement according to clause 1, 2 or 3, wherein the second seat having an aisle access which is provided between the third seat and a foot support structure of the first seat.

Clause 12. The seating arrangement according to clause 11, wherein the aisle access to the second seat is provided in front of the second seat with respect to its respective seat axis, wherein the aisle access is substantially running laterally along the first seat and its respective privacy area.

Clause 13. The seating arrangement according to clause 1, 2 or 3, wherein the third seat having an aisle access which is provided in front of the first and second seats.

Clause 14. The seating arrangement according to clause 13, wherein the aisle access to the third seat extends substantially perpendicular to its respective seat axis.

Clause 15. The seating arrangement according to clause 1, 2 or 3, wherein the first seat having an aisle access which is directly accessible from an aisle of the vehicle cabin.

Clause 16. The seating arrangement according to clause 1, 2 or 3, wherein the first seat having a first foot support structure and the second seat having a second foot support structure, wherein the second foot support structure is arranged between the first foot support structure and the third seat.

Clause 17. The seating arrangement according to clause 16, wherein the second foot support structure is movable between a deployed use position and a stowed position.

Clause 18. The seating arrangement according to clause 16, wherein the second foot support structure is narrower than a total distance between the third seat and the first foot support structure.

Clause 19. The seating arrangement according to clause 1, 2 or 3, wherein the first seat having a respective privacy area having:
- two lateral armrests;
- a partition wall arranged at least partially surrounding the first seat;
- a side utility element;

a divider screen laterally delimiting the respective privacy area of the first seat from respective privacy areas of adjacent seats; and
a foot support structure.

Clause 20. The seating arrangement according to clause 1, 2 or 3, wherein the second and third seats each having a respective privacy area having:
two lateral armrests;
a partition wall arranged at least partially surrounding the corresponding second or third seat; and
a side utility element.

The invention claimed is:

1. A seating arrangement in a cabin of an aircraft having a single aisle, the seating arrangement comprising:
    a first seat as an aisle seat arranged extending substantially along a longitudinal direction of the cabin to which the first seat borders the single aisle and has direct aisle access, the first seat having a first foot support structure and a privacy area with a first partition wall arranged at least partially surrounding the first seat;
    a second seat as a non-aisle seat bordering a cabin wall of the cabin, the second seat having a second foot support structure hingedly mounted to the first foot support structure between a deployed use position and a stowed non-use position; and
    a third seat as a non-aisle seat bordering the cabin wall, the second seat and the third seat being arranged one behind another and laterally offset with respect to the first seat for direct aisle access to the single aisle, wherein the second foot support structure is arranged laterally between the first foot support structure and the third seat, wherein the privacy area includes a side utility element arranged between the first seat and the second seat, the first seat and the second seat being laterally distanced from each other by at least the side utility element.

2. A cabin of an aircraft having a single aisle, the cabin comprising:
    a cabin wall; and
    a seating arrangement that comprises:
        a first seat as an aisle seat arranged extending substantially along a longitudinal direction of the cabin to which the first seat borders the single aisle and has direct aisle access, the first seat having a first foot support structure and a privacy area with a first partition wall arranged at least partially surrounding the first seat;
        a second seat as a non-aisle seat bordering the cabin wall, the second seat having a second foot support structure hingedly mounted to the first foot support structure between a deployed use position and a stowed non-use position; and
        a third seat as a non-aisle seat bordering the cabin wall, the second seat and the third seat being arranged one behind another and laterally offset with respect to the first seat for direct aisle access to the single aisle, wherein the second foot support structure is arranged laterally between the first foot support structure and the third seat, wherein the privacy area includes a side utility element arranged between the first seat and the second seat, the first seat and the second seat being laterally distanced from each other by at least the side utility element.

3. A seating arrangement in a vehicle cabin of an aircraft having a single aisle, the seating arrangement comprising:
    a group of seats arranged in a longitudinal direction of the vehicle cabin, the group of seats including:
        a first seat as an aisle seat arranged extending substantially along a longitudinal direction of the vehicle cabin to which the first seat borders the single aisle and has direct aisle access, the first seat having a first foot support structure and a privacy area with a first partition wall arranged at least partially surrounding the first seat;
        a second seat as a non-aisle seat bordering a cabin wall of the vehicle cabin, the second seat having a second foot support structure hingedly mounted to the first foot support structure of the first seat between a deployed use position and a stowed non-use position; and
        a third seat as a non-aisle seat bordering the cabin wall, the second seat and the third seat being arranged one behind another and laterally offset with respect to the first seat for direct aisle access to the single aisle, wherein the second foot support structure is arranged laterally between the first foot support structure and the third seat, wherein the privacy area includes a side utility element arranged between the first seat and the second seat, the first seat and the second seat being laterally distanced from each other by at least the side utility element.

4. The seating arrangement of claim 1, wherein the second foot support structure is arranged laterally between the first foot support structure of the first seat and an armrest of the third seat.

5. The seating arrangement of claim 4, wherein the second foot support structure is hingedly mounted to the armrest of the third seat between a deployed use position and a stowed non-use position.

6. The seating arrangement of claim 5, wherein the direct aisle access of the second seat is:
    at least enlarged in the stowed non-use position of the second foot support structure, and
    partially or fully closed in the deployed use position of the second foot support structure.

7. The seating arrangement of claim 1, wherein the direct aisle access of the second seat is:
    at least enlarged in the stowed non-use position of the second foot support structure, and
    partially or fully closed in the deployed use position of the second foot support structure.

8. The cabin of claim 2, wherein the second foot support structure is arranged laterally between the first foot support structure and an armrest of the third seat.

9. The cabin of claim 8, wherein the second foot support structure is hingedly mounted to the armrest of the third seat between a deployed use position and a stowed non-use position.

10. The cabin of claim 9, wherein the direct aisle access of the second seat is:
    at least enlarged in the stowed non-use position of the second foot support structure, and
    partially or fully closed in the deployed use position of the second foot support structure.

11. The cabin of claim 2, wherein the direct aisle access of the second seat is:
    at least enlarged in the stowed non-use position of the second foot support structure, and
    partially or fully closed in the deployed use position of the second foot support structure.

12. The seating arrangement of claim 3, wherein the second foot support structure is arranged laterally between the first foot support structure and an armrest of the third seat.

13. The seating arrangement of claim 12, wherein the second foot support structure is hingedly mounted to the armrest of the third seat between a deployed use position and a stowed non-use position.

14. The seating arrangement of claim 13, wherein the direct aisle access of the second seat is:
   at least enlarged in the stowed non-use position of the second foot support structure, and
   partially or fully closed in the deployed use position of the second foot support structure.

15. The seating arrangement of claim 3, wherein the direct aisle access of the second seat is:
   at least enlarged in the stowed non-use position of the second foot support structure, and
   partially or fully closed in the deployed use position of the second foot support structure.

* * * * *